United States Patent [19]

Thearling

[11] Patent Number: 5,839,120
[45] Date of Patent: Nov. 17, 1998

[54] GENETIC ALGORITHM CONTROL ARRANGEMENT FOR MASSIVELY PARALLEL COMPUTER

[76] Inventor: Kurt Thearling, 13172 Commonwealth, Southgate, Mich. 48195

[21] Appl. No.: 856,401

[22] Filed: May 14, 1997

Related U.S. Application Data

[63] Continuation of Ser. No. 159,336, Nov. 30, 1993, abandoned.

[51] Int. Cl.$^6$ .......................................... G06F 15/18
[52] U.S. Cl. ............................................................ 706/13
[58] Field of Search ................................. 703/12, 13, 77, 703/11

[56] References Cited

U.S. PATENT DOCUMENTS

| | | | |
|---|---|---|---|
| 5,136,686 | 8/1992 | Koza | 395/13 |
| 5,222,192 | 6/1993 | Shaefer | 395/13 |
| 5,245,696 | 9/1993 | Stork et al. | 395/13 |
| 5,249,259 | 9/1993 | Harvey | 395/13 |
| 5,511,158 | 4/1996 | Sims | 395/140 |

OTHER PUBLICATIONS

O'Neill, "The ARGOT Strategy III: The BBN Butterfly Multiprocessor"; Supercomputing '88 vol. II: Science and Applications, pp. 214–227, Jan. 1988.

McClurkin, "Gentic Algorithm for Spatial Spectral Estimation"; Spectrum Estimation and Modeling, 4th ASSP Workshop 1988, pp. 318–322, Jan. 1988.

Sharman et al, "Genetic Algorithm for maximum likelihood parameter estimation"; ICASSP '89, pp. 2716–2719, Jan. 1989.

Hou et al, "a genetic algorithm for multiprocessor scheduling"; IEEE Transactions on Parallel and Distributed Systems, vol. 5 iss. 2, pp. 113–120. Feb. 1994.

Talbi et al, "hill–climbing, simulated annealing and genetic algorithms: a comparative study and application to the mapping problem"; Proceedings of the Twenty–Sixth Hawaii International Conference on System Sciences, vol. 2, pp. 565–573. 5–8 Jan. 1993.

*Primary Examiner*—Tariq R. Hafiz

[57] ABSTRACT

A genetic algorithm arrangement comprising a processor array controlled by a control arrangement through a number of iterations. The processor array comprises a plurality of processing nodes interconnected by an interconnection network for transferring messages among the processing nodes. In accordance with the control arrangement, the processing nodes are first enabled to establish a genome array comprising a plurality of entries, each processing node having a selected number of entries, each entry receiving a genome. The processing nodes are then enabled to perform an evaluation operation in connection with each genome to generate an evaluation score associated with each genome. The processing nodes are enabled to generate a threshold value in response to the evaluations for the respective genomes. Surviving genomes are then identified by the processing nodes as those genomes in respective portions of the genome array response to the threshold value. The processing nodes then are enabled to propagate the surviving genomes through the entries of the genome array as a function of their respective evaluation scores. The control portion then enables the processing nodes perform a mating operation in connection with a genome in each entry of the genome array and a genome in a respective randomly-selected entry of the genome array. The control portion enables the processing nodes to perform these operations through a series of iterations.

53 Claims, 7 Drawing Sheets

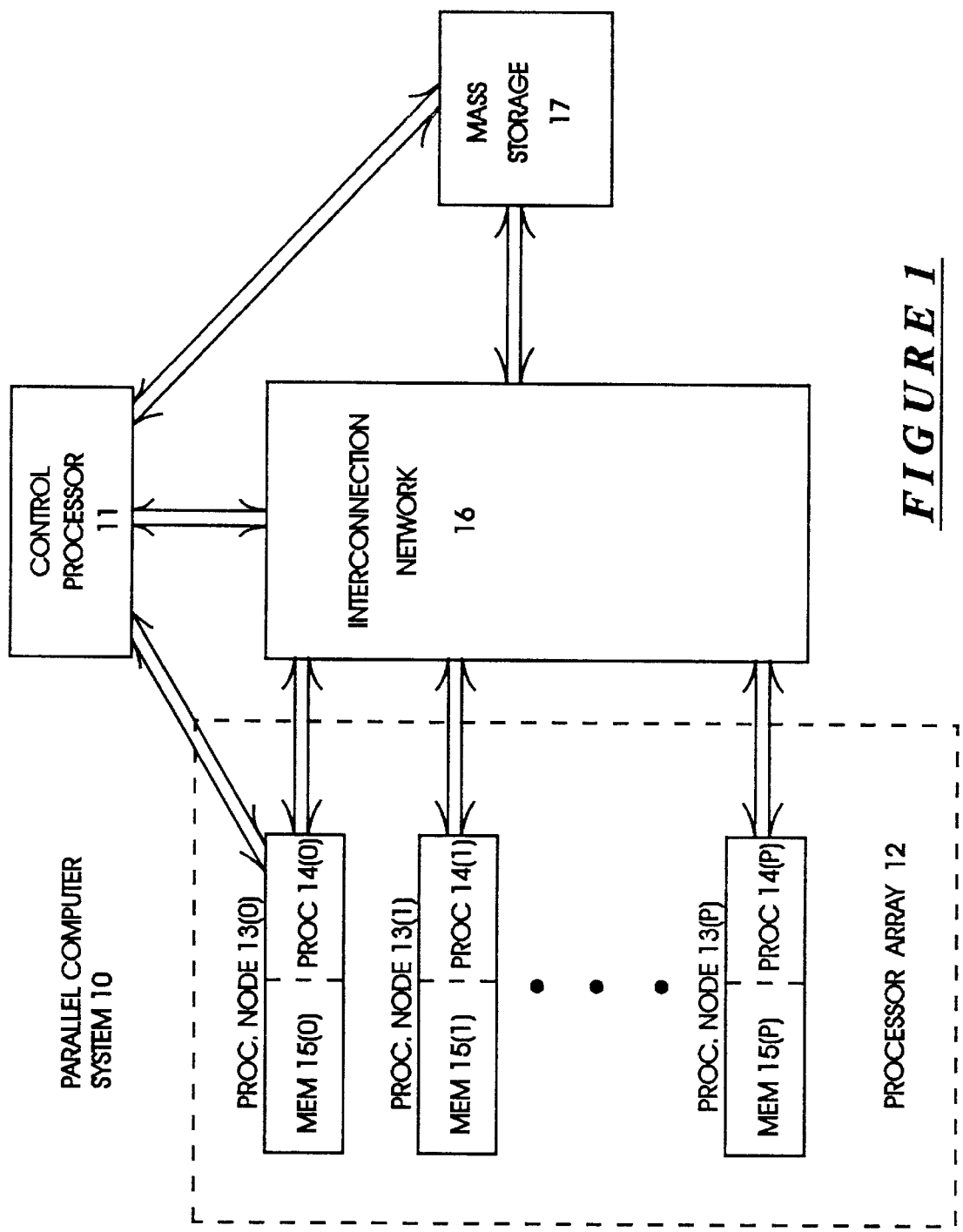

FIGURE 2A

100. INITIAL SET OF GENOMES ARE DISTRIBUTED TO PROCESSING NODES AND STORED IN ENTRIES IN A GENOME ARRAY ACCORDING TO A PREDETERMINED SHAPE DESIGNATION

←────────────── A (FROM FIG. 2F)

101. PROCESSING NODES IN PARALLEL PERFORM EVALUATION OPERATION TO GENERATE AN EVALUATION SCORE FOR EACH GENOME IN GENOME ARRAY

102. PROCESSING NODES DETERMINE A RANK VALUE FOR EACH EVALUATION SCORE

103. PROCESSING NODES ESTABLISH A SORTED EVALUATION SCORE ARRAY, AND GENERATE MESSAGE FOR EACH EVALUATION SCORE INCLUDING A DESTINATION ADDRESSES GENERATED USING THE ASSOCIATED RANK VALUE AND THE SHAPE DESIGNATION

104. PROCESSING NODES PERFORM SEND OPERATION TO SEND COPY OF EVALUATION SCORES INTO ENTRIES IN SORTED EVALUATION SCORE ARRAY ACCORDING TO THE EVALUATION SCORES' DESTINATION ADDRESSES

105. PROCESSING NODES IDENTIFY, IN RESPONSE TO A REAPER PERCENTAGE VALUE, A SURVIVAL VALUE IDENTIFYING THE PERCENTAGE OF GENOMES TO SURVIVE TO THE NEXT GENERATION

A
(TO FIG. 2B)

FIGURE 2B (FROM FIG. 2A)
A
↓

106. PROCESSING NODES IDENTIFY AN ENTRY IN THE SORTED EVALUATION SCORE ARRAY IDENTIFIED BY THE INDEX, THE SORTED EVALUATION SCORE IN THE IDENTIFIED ENTRY DEFINING A THRESHOLD SCORE VALUE

↓

107. PROCESSING NODES ESTABLISH AN "ALIVE" FLAG ASSOCIATED WITH EACH GENOME, HAVING A SET CONDITION IF THE GENOME'S EVALUATION SCORE VALUE IS EQUAL TO OR ABOVE THE THRESHOLD SCORE VALUE AND OTHERWISE CLEAR

↓

108. PROCESSING NODES RESET TO ZERO EVALUATION SCORE VALUES ASSOCIATED WITH GENOMES HAVING CLEAR "ALIVE" FLAGS

↓

109. PROCESSING NODES DECREMENT EACH GENOME'S EVALUATION SCORE BY A VALUE CORRESPONDING TO THE THRESHOLD SCORE VALUE; IF DECREMENTED EVALUATION SCORE IS LESS THAN ZERO, PROCESSING NODE RESETS IT TO ZERO

↓
B
(TO FIG. 2C)

FIGURE 2C (FROM FIG. 2B)
B
↓

110. PROCESSING NODES PERFORM A REDUCE-WITH-ADD OPERATION IN CONNECTION WITH GENOMES' DECREMENTED EVALUATION SCORES TO GENERATE A TOTAL SCORE VALUE WHICH IS THE SUM OF THE GENOMES' DECREMENTED EVALUATION SCORES

↓

111. PROCESSING NODES PERFORM A SCAN-WITH-ADD OPERATION IN CONNECTION WITH GENOMES' DECREMENTED EVALUATION SCORES TO GENERATE FOR EACH GENOME A RUNNING SCORE VALUE CORRESPONDING TO THE SUM OF THE DECREMENTED EVALUATION SCORES

↓

112. PROCESSING NODES ASSOCIATE WITH EACH ENTRY IN THE GENOME ARRAY A SEGMENT FLAG, ALL SEGMENT FLAGS INITIALLY HAVING CLEAR CONDITIONS

↓

113. PROCESSING NODES GENERATE FOR EACH GENOME HAVING A SET ALIVE FLAG AN ADDRESS VALUE IDENTIFYING A LOCATION IN A SECOND GENOME ARRAY IN RESPONSE TO THE GENOME'S DECREMENTED EVALUATION SCORE, THE TOTAL SCORE AND THE NUMBER OF GENOMES WHICH HAVE SET ALIVE FLAGS

↓
C
(TO FIG 2D)

FIGURE 2D (FROM FIG. 2C)
C
↓

114. PROCESSING NODES SET SEGMENT FLAGS FOR ENTRIES IN GENOME ARRAY IDENTIFIED BY GENERATED ADDRESS VALUES

↓

115. PROCESSING NODES TRANSMIT GENOMES WHICH HAVE SET ALIVE FLAGS TO RESPECTIVE PROCESSING NODES AND LOCATIONS IDENTIFIED BY THEIR ADDRESS VALUES

↓

116. PROCESSING NODES COPY EACH GENOME INTO SUCCESSIVE GENOME LOCATIONS IN THE GENOME ARRAY, UP TO THE NEXT LOCATION IN THE GENOME ARRAY THAT HAS A SET SEGMENT FLAG

↓

117. PROCESSING NODES GENERATE FOR EACH GENOME A RANDOM NUMERICAL VALUE

↓

118. PROCESSING NODES GENERATE A RANK VALUE FOR EACH RANDOM NUMERICAL VALUE

↓
D
(TO FIG. 2E)

FIGURE 2E (FROM FIG. 2D)
D
↓

119. PROCESSING NODES GENERATE A DESTINATION ADDRESS INTO THE SECOND GENOME ARRAY FOR EACH GENOME IN RESPONSE TO THE RANK VALUE GENERATED FOR THE GENOME'S ASSOCIATED RANDOM NUMERICAL VALUE AND THE SHAPE DESIGNATION

↓

120. PROCESSING NODES PERFORM RANDOM MATING OPERATION IN CONNECTION WITH GENOMES IN ENTRIES IN GENOME ARRAY AND CORRESPONDING ENTRIES IN THE SECOND GENOME ARRAY FOR ARRAY ENTRIES WHOSE SEGMENT FLAG IS NOT SET

↓

121. PROCESSING NODES GENERATE FOR EACH GENOME A RANDOM NUMERICAL VALUE

↓

122. PROCESSING NODES GENERATE A RANK VALUE FOR EACH RANDOM NUMERICAL VALUE

↓
E
(TO FIG. 2F)

FIGURE 2F (FROM FIG. 2E)
E
↓

123. PROCESSING NODES GENERATE A DESTINATION ADDRESS INTO GENOME ARRAY FOR EACH GENOME IN RESPONSE TO THE RANK VALUE GENERATED FOR THE GENOME'S ASSOCIATED RANDOM NUMERICAL VALUE AND THE SHAPE DESIGNATION

↓

124. PROCESSING NODES PERFORM SEND OPERATION TO SEND GENOMES TO LOCATIONS IN GENOME ARRAY IDENTIFIED BY ASSOCIATED DESTINATION ADDRESSES

↓
A
(TO FIG. 2A)

GENETIC ALGORITHM CONTROL ARRANGEMENT FOR MASSIVELY PARALLEL COMPUTER

This is a Continuation of application Ser. No. 08/159,336 filed on Nov. 30, 1993, now abandoned.

FIELD OF THE INVENTION

The invention relates generally to the field of parallel computer systems, and more particularly to genetic algorithm control arrangements for use with such systems.

BACKGROUND OF THE INVENTION

Developing computer programs and verifying them to be optimum has proven to be a difficult and arduous task for a number of classes of problems. Genetic algorithm methodologies have been developed to facilitate development of optimal solutions. In genetic algorithm methodologies, programs are represented by "genomes," which, in a series of iterations, are evaluated (by execution of the respective programs represented thereby), selected (in accordance with some criteria related to execution, such as execution speed) and mated and mutated in a selected manner. The result at the end of each iteration represents a set of programs which, in turn, are evaluated during a subsequent iteration. In each iteration, characteristics of those genomes that are selected in the selection step survive to the next iteration, in a manner similar to survival of genetic traits from one generation to the next under Darwin's theory of natural selection. Genetic algorithm methodologies thus facilitate construction of what might be described as "spaces" of programs, which are searched for optimal programming solutions.

SUMMARY OF THE INVENTION

The invention provides a new and improved genetic algorithm control arrangement for a parallel computer system.

In brief summary, a genetic algorithm arrangement comprises a processor array controlled by a control arrangement. The processor array comprises a plurality of processing nodes interconnected by an interconnection network for transferring messages among the processing nodes. The control arrangement controls the processing nodes of the processor array through a series of iterations. Initially, a genome array establishment portion enables the processing nodes to establish a genome array comprising a plurality of entries, each processing node having a selected number of entries, each entry receiving a genome. An evaluation score generation control portion enables the processing nodes to perform an evaluation operation in connection with each genome to generate an evaluation score associated with each genome. A threshold score generation control portion enables the processing nodes to generate a threshold value in response to the evaluations for the respective genomes. A surviving genome control portion enables the processing nodes to identify as surviving genomes those genomes in respective portions of the genome array response to the threshold value. A surviving genome propagation control portion enables the processing nodes to propagate the surviving genomes through the entries of the genome array as a function of their respective evaluation scores. A genome mating control portion enables the processing nodes to perform a mating operation in connection with a genome in each entry of the genome array and a genome in a respective randomly-selected entry of the genome array. An iteration control portion enables the genome array establishment portion, the evaluation score generation control portion, the threshold score generation control portion, the surviving genome propagation control portion and the genome mating control portion, to control the processing nodes in a series of iterations.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 1 is a functional block diagram of a parallel computer system forming part of the invention; and FIGS. 2A through 2F jointly comprise a flow diagram illustrating operations performed by the system depicted in FIG. 1 in connection with the invention.

DETAILED DESCRIPTION OF AN ILLUSTRATIVE EMBODIMENT

Before describing the genetic algorithm arrangement, it would be helpful to describe the general structure of a parallel computer system forming part of the arrangement. FIG. 1 depicts a functional block diagram of a parallel computer system 10 forming part of the genetic algorithm arrangement. With reference to FIG. 1, the parallel computer system 10 includes a control processor 11 which transmits commands to a processor array 12, and specifically to a plurality of processing nodes 13(0) through 13(P) [generally identified by reference numeral 13($i$)], to control processing thereby. Each processing node 13($i$) includes a processor 14($i$) and a memory 15($i$), with the memory 15($i$) having a plurality of storage locations for storing data and instructions. The processor 14($i$) of each processing node 13($i$) performs processing operations as defined in the commands from the control processor 11 in connection with data stored in its respective memory 15($i$). In performing the processing operations, the processor 14($i$) may make use of the instructions stored in its associated memory 15($i$). Depending on particular sequences of instructions used by the processors 14($i$) for particular commands, the processing nodes 13($i$) may be performing generally similar operations in response to a command, or they may perform diverse types of operations.

In connection with the processing operations enabled by the commands provided by the control processor 11, the processing nodes 13($i$), and in particular the respective processors 14($i$), may also generate messages for transmission over an interconnection network 16. Messages may contain data, thereby facilitating the transfer of data from one processing node, identified as a source processing node 13($s$), to another processing node, identified as a destination processing node 13($d$). The processing nodes 13($i$) and the control processor 11 may also transmit messages to each other over the interconnection network 16 to thereby facilitate the transfer of data therebetween. Processing nodes 13($i$) and control processor 11 may also transmit messages to facilitate synchronization of their various processing and message generation and transfer operations.

While the parallel computer system 10 depicted in FIG. 1 has been described as having a control processor 11 separate and apart from the processing nodes 13($i$) of the processor array 12, it will be appreciated the system 10 will not necessarily require that the control processor 11 be physically a processor or element separate and apart from the processing nodes 13($i$). One or more of the processing nodes 13(*i*) may, in addition to performing the operations of the processing nodes described above, in addition perform the functions of the control processor 11 described above.

The system 10 further includes a mass storage subsystem 17 which stores data for all of the processing nodes 13(*i*) and also for the control processor. Input/output commands from the control processor 11 enable the processing nodes 13(*i*) of processor array 12 and the mass storage subsystem 17 to cooperate to transfer data stored in the mass storage subsystem 17 through the interconnection network 16 to the processing nodes 13(*i*) for processing. Input/output commands also enable the processing nodes 13(*i*) and mass storage subsystem 17 to cooperate to transfer data from the processing nodes 13(*i*) to the mass storage subsystem for storage.

The genetic algorithm arrangement further includes a control arrangement for controlling the parallel computer system 10 to implement searching of program spaces using genetic algorithm methodologies. The operations performed by the system 10 in accordance with the genetic algorithm arrangement are depicted in flow charts contained in FIGS. 2A through 2F. The control arrangement enables the system 10 to perform a series of iterations to develop and search "spaces" of computer programs to obtain one or more programs which are deemed optimal. The control arrangement may enable the system to perform a number of iterations as specified by a user, or it may provide information to the user at the end of each selected number of iteration to enable the user to determine whether it should continue, or alternatively it may continue until it reaches some other selected termination criteria.

The genetic algorithm arrangement operates in connection with data in the form of "genomes," which are data words of, for a particular computer program space, of a selected structure. The particular structure of a genome is determined by the particular application for which the computer programs are to be used. For a particular program space, each genome has a predetermined number of fields, in a predetermined order, with each field having a number of data bits. The detailed genome structures for program spaces are well known to those skilled in the art, and will not be described herein.

With this background, with reference to FIG. 2A, in accordance with the genetic algorithm arrangement an initial set of genomes are distributed to the processing nodes 13(*i*) (step 100). The initial set of genomes may be generated in a conventional manner. Generally, the genomes will be generated as random values. The processing nodes 13(*i*) collectively establish in their memories 15(*i*) a genome array that comprises a plurality of entries, with each entry in the genome array receiving and storing a genome. The entries of the genome array may be considered to be organized in a plurality of rows and a plurality of columns, with the number of columns corresponding to the number of processing nodes 13(*i*), and each column being associated with one processing node 13(*i*), that is, each processing node 13(*i*) having, in a series of successive storage locations in its memory 15(*i*), entries in the genome array. Preferably, the processing nodes 13(*i*) will all have generally the same number of genomes, and thus entries in the genome array, to provide for general balancing of the processing load among the processing nodes in the subsequent operations. The genome array has a particular predetermined "shape", defined by the number of columns (corresponding to the number of processing nodes) and number of rows (corresponding to the number of genomes assigned to each processing node 13(*i*)).

After the processing nodes 13(*i*) receive the initial set of genomes, in accordance with the generic algorithm arrangement they, in parallel, perform an evaluation operation in connection with the genomes to generate an evaluation score for each genome in the genome array (step 101). In that operation, the parallel computer system 10 (FIG. 1) will process each of the programs represented by the respective genomes and develop a score in response to selected processing criteria in a conventional manner. For example, the processing criteria may relate to the time required to process the program represented by the genome.

After generating the evaluation scores for the genomes, the processing nodes 13(*i*) perform a series of steps 102 through 106 to generate a threshold evaluation score used to identify the genomes to survive to the next generation. Initially, the processing nodes 13(*i*) perform steps 102 through 104 to establish a sorted evaluation score array, having entries with the same structure and shape as the genome array, and to place the evaluation scores in order in the sorted evaluation score array according to their evaluation scores. In that operation, the entries in the column of the sorted evaluation score array maintained by processing node 13(*x*) will receive evaluation scores which are higher than the evaluation scores in the column maintained by processing node 13(*y*) if x>y, and the evaluation scores in successive entries in each column are in numerical order. To place the evaluation scores in order, the processing nodes 13(*i*) initially determine a rank value for evaluation scores, which identifies for each evaluation score the evaluation score's ranking among the evaluation scores generated in step 101 (step 102). The processing nodes 13(*i*) then establish the sorted evaluation score array and generate messages which they transmit over the interconnection network 16 to place the evaluation scores in sorted order in the sorted evaluation score array (step 103). In generating each message, the processing nodes generate a destination address reflecting the rank value associated with the evaluation score to be transmitted in the message, and the shape designation. The resulting destination address will identify the processing node 13(*i*) to receive the message and the location of the entry in the receiving processing node's memory 15(*i*) to place the evaluation scores in sorted order. The processing nodes 13(*i*) then perform a send operation to transmit the messages over the interconnection network (step 104).

Following step 104, the evaluation scores are in sorted order. The control processor 11, or the processing nodes 13(*i*), in response to a reaper percentage identifying the percentage of genomes to survive to the next generation, generate a survival value that identifies the number of genomes to survive (step 105). Using the survival value and the shape designation of the sorted evaluation score array, an entry in the sorted evaluation score array is identified (step 106). That entry, plus the number of entries in the sorted evaluation score array having equal or higher evaluation scores, corresponds to the survival value, that is, the number of genomes to survive to the next generation, and thus the evaluation score in the identified entry is used as a threshold evaluation score value.

The threshold evaluation score value determined in step 106 is then broadcast to all of the processing nodes 13(*i*), and the processing nodes 13(*i*) perform a comparison operation to compare the threshold evaluation score with the evaluation scores of all of the genomes in their respective portion of the genome array. For each genome, the processing nodes 13(*i*) establish an "alive" flag and condition the flag in response to the result of the comparison operation (step 107). In response to a positive comparison in step 107, indicating that the genome's evaluation score had a selected relationship to the threshold evaluation score (such as if the evaluation score was greater than or equal to the threshold evaluation score), the processing node 13(i) will set the genome's alive flag, and otherwise it will clear the genome's alive flag.

Following step 107, the processing nodes 13(i) perform a series of steps 108 through 116 essentially to reproduce the surviving genomes in the genome array in weighted relation to their respective evaluation scores, in particular in weighted relation to the difference between their respective evaluation scores and the threshold score. In that operation, the processing nodes 13(i) initially reset to zero the evaluation score values that are associated with each of the genomes in the genome array which have a clear alive flag (step 108). The processing nodes 13(i) then decrement each respective genome's evaluation score by the threshold evaluation score (step 109). In that operation, the processing nodes 13(i) reset to zero those decremented threshold scores which are below zero, that is, the decremented evaluation scores associated with the genomes whose alive flags are clear. The processing nodes 13(i) then perform, in connection with the decremented evaluation scores, a "reduce" operation to generate a total score value, which is the sum of the decremented evaluation scores for all of the genomes (step 110) and a "scan-with-add" operation to generate a scan score value, which is a running sum of decremented evaluation scores for the genomes in the genome array up to, but not including, the particular genome (step 111). That is:

$$SSV(i+1)=SUM\{DES[gen(i)]\}, \text{ where}$$

"SSV" is the scan score value, "DES" is the decremented valuation score for the genome in entry gen(i), and "SUM" indicates the sum operator. (The "reduce" and "scan-with-add" operations are well known and will not be described herein.) The processing nodes 13(i) then establish a segment flag associated with each entry in the genome array, with all of the segment flags initially having a clear condition (step 112).

The processing nodes 13(i) then generate, for each genome which have set alive flags, that is, for each genome to survive to the next generation, an address value using the scan score value and the decremented evaluation score value associated with the genome, as well as the total score value and the number of genomes in the genome array (step 113). In that operation, for each genome, a processing node 13(i) determines the difference between the scan score value and the decremented score value for the genome, divides the difference by the total score value. Since the total number of genomes in the genome array in each generation will be the same, the processing node 13(i) multiplies the quotient by the number of genomes in the genome array, with the result being a function of the required address value. The address value is actually an offset value, which will be used to identify an entry in a second genome array, which has the same size and shape as the original genome array, but at different locations in the memories 15(i) of the processing nodes 13(i). Accordingly, each entry in the second genome array will have a corresponding entry in the original genome array, with the correspondence being defined by the respective offset values, from an array base, for the entry.

After generating the address values (step 113), the processing nodes 13(i) use the address values to identify entries in the original genome array whose segment flags are to be set (step 114). In addition, the processing nodes 13(i) generate, for each genome with a set alive flag, a message including the genome and a destination address, with the destination address being generated using the address value and the predetermined shape designation. The processing nodes 13(i) transmit the generated messages over the interconnection network 16 to transmit the surviving genomes to entries of the second genome array identified by the respective address values (step 115).

As noted above, each entry in the second genome array corresponds to an entry in the original genome array. As is evident, the entries in the second genome array which received genomes in step 115 correspond to the entries in the original genome array whose segment flags were set in step 114. Following step 115, the processing nodes 13(i) copy each genome from an entry in the second genome array into the corresponding entry of the original genome array, and also copies the genome into successive entries in the original genome array up to, but not including, the next higher entry whose segment flag is set. Since, for each genome in an entry gen(i), the starting entry gen(i+1) in the original genome array for the next genome in the array is based on the scan score value for the next genome gen(i+1), which scan score value in turn reflects the first genome's [that is, the genome in entry gen(i)] evaluation score value, the number of copies of the genome in the original genome array will be a function of its decremented evaluation score value. At the end of step 116, the genomes have been reproduced or propagated generally in proportion to their respective decremented evaluation scores.

Following step 116, the processing nodes 13(i) perform a series of steps 117 through 120 to use the genomes in the original genome array generate, for each such genome, a mating genome and to perform a mating operation, thereby to create a set of "next-generation" genomes for a subsequent iteration. It will be appreciated that, at this point, all of the genomes in the original genome array are either the original or a copy of the genomes selected to survive to the next generation. In those operations, the processing nodes 13(i) initially generates a random number for each genome in an entry in the original genome array (step 117) and generates a rank value for each of the random numbers to rank the numbers that were generated in step 117 (step 118). Each rank value is used to identify an entry in the second genome array to which a copy of the genome in the original genome array will be transmitted. Following step 118, for each entry in the original genome array, the processing nodes 13(i) generate an address using the rank values and the predetermined shape designation identifying an entry in the second genome array. Thereafter, the processing nodes 13(i) generate messages, which they transmit over the interconnection network 16, to send copies of the genomes into entries in the second genome array (step 119). Since the addresses are generated in response to rank values, which in turn are generated in response to random numbers, the genome copies are randomly distributed in the second genome array.

Thereafter, the processing nodes 13(i) perform a mating operation between the genome in each entry in the original genome array and the genome copy in the corresponding entry in the second genome array, except for the genomes in the entries of the original genome array whose segment flags are set (step 120). In the mating operation, for each genome and genome copy, the processing node 13(i) substitutes, for selected fields from the genome in the original genome array, corresponding fields from the genome copy. The selection is preferably made on a random basis, so that, for different genome/genome copy pairs from corresponding entries of the original genome array and the second genome array, diverse sets of fields from the genome copy will be substituted for corresponding fields of the respective genomes. Since no mating operation is performed in connection with the genomes in the entries of the original genome array whose segment flags are set, the genetic algorithm arrangement assures that at least one copy of each genome whose evaluation score exceeded the threshold evaluation score value will be preserved to the next generation.

Following step 120, the genomes constitute a subsequent generation, which may be used in a subsequent iteration. However, in one embodiment the genetic algorithm arrangement performs a series of steps 121 through 124 to randomize the locations of the various genomes in the original genome array, which can assist in randomizing processing loads among the processing nodes 13($i$), when performing the evaluation step (step 101) in a subsequent iteration. In those operations, the processing nodes 13($i$) generate a random number for each genome in the original genome array (step 121), generate a rank value in response to the random numbers (step 122), and generate messages for transmission over the interconnection network 16 using genomes and an address value generated in response to the rank value and the predetermined shape designations (step 123). The processing nodes 13($i$) transmit the messages over the interconnection network 16 to reorder the genomes according to their respective random addresses. Thereafter, if a subsequent iteration is to be performed, the genetic algorithm arrangement returns to step 101 to perform a subsequent iteration.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A genetic algorithm system comprising:
   A. a processor array comprising a plurality of processing nodes interconnected by an interconnection network for transferring messages among the processing nodes;
   B. a control subsystem comprising:
      i. a genome generation portion for enabling the processing nodes to a plurality of genomes distributed among the processing nodes;
      ii. an evaluation score generation control portion for enabling said processing nodes to perform an evaluation operation in connection with each genome to generate an evaluation score associated with each genome, said evaluation score generation control portion including:
         (a) an evaluation score array generation control portion for enabling said processing nodes to establish an evaluation score array having a plurality of evaluation score entries each associated with a genome,
         (b) an evaluation score control portion for enabling the processing nodes to, in parallel, perform evaluation operations in connection with each of their respective genomes to generate an evaluation score and for storing the evaluation score in the evaluation score array entry associated therewith;
      iii. a threshold score generation control portion for enabling said processing nodes to generate a threshold value in response to the evaluation scores for the respective genomes, said threshold score generation control portion comprising:
         (a) a sort control portion for enabling the processing nodes to generate a sorted evaluation score array comprising a plurality of sorted evaluation score entries in which the evaluation scores from the evaluation score array are in stored order;
         (b) a threshold identifier for enabling the processing nodes to identify a sorted evaluation score entry in response to a reaper percentage value, the evaluation score in the identified sorted evaluation score entry comprising the threshold value;
      iv. a surviving genome control portion for enabling said processing nodes to identify from the genomes, surviving genomes in response to each genome's evaluation score and the threshold value;
      v. a surviving genome propagation control portion for enabling said processing nodes to, in messages transmitted over the interconnection network, duplicate the surviving genomes as a function of their respective evaluation scores and, in messages transmitted over the interconnection network;
      vi. a genome mating control portion for enabling said processing nodes to perform a random mating operation in connection with surviving genomes and the original genomes to generate a plurality of mated genomes for use along with the surviving genomes as genomes in a subsequent iteration; and
      vii. an iteration control portion for enabling said genome array establishment portion, said evaluation score generation control portion, said threshold score generation control portion, said surviving genome propagation control portion and said genome mating control portion, to control said processing nodes in a series of iterations, the mated genomes and surviving genomes generated during each iteration being used as genomes for the subsequent iteration.

2. A genetic algorithm system as defined in claim 1 in which the genome generation portion enables the processing nodes to generate a genome array comprising a plurality of genome entries distributed among said processing nodes, each genome entry including a genome.

3. A genetic algorithm system as defined in claim 1 in which said threshold score generation control portion further enables one of said processing nodes which maintains the identified sorted evaluation score entry to generate a broadcast message including the threshold value for broadcast over interconnection network, thereby to distribute the threshold value to all of said processing nodes.

4. A genetic algorithm system as defined in claim 1 in which said surviving genome control portion enables said processing nodes to compare each genome's evaluation score to the threshold value to identify surviving genomes.

5. A genetic algorithm system as defined in claim 4 in which the surviving genome control portion includes:
   A. an alive flag array generator for enabling said processing nodes to generate an alive flag array comprising a plurality of flags each associated with a genome;
   B. a comparator for enabling said processing nodes to compare the evaluation scores associated with the genomes maintained by the respective processing nodes to the threshold value to identify surviving genomes; and
   C. an alive flag conditioner for enabling the processing nodes to condition the alive flags in response to the comparison.

6. A genetic algorithm system as defined in claim 1 in which the surviving genome propagation control portion enables said processing nodes to generate a surviving genome array including a number of entries each containing a copy of a surviving genome, the surviving genome propagation control portion generating a number of copies of each surviving genome in relation to its evaluation score and a value corresponding to the sum of normalized evaluation scores for the surviving genomes.

7. A genetic algorithm system as defined in claim 6 in which, for each surviving genome, the normalized evaluation score corresponds to the difference between the surviving genome's evaluation score and the threshold value.

8. A genetic algorithm system as defined in claim 6 in which the surviving genome copies are distributed among the processing nodes.

9. A genetic algorithm system as defined in claim 6 in which the genome mating control portion includes:
   A. a genome distribution element for enabling the processing nodes to randomly distribute said genomes thereamong said processing nodes in messages transmitted over the interconnection network;
   B. a mating operation control element for enabling the processing nodes to perform a mating operation between genomes and the surviving genome copies to generate mated genomes.

10. A genetic algorithm system as defined in claim 9 in which the genome mating control portion enables the processing nodes to maintain at least some surviving genome copies in an unmated condition.

11. A genetic algorithm system as defined in claim 9 in which the genome mating control portion further includes a mated genome distribution control element for enabling the processing nodes to randomly distribute the mated genomes among the processing nodes for use as genomes during a subsequent iteration.

12. A genetic algorithm method for controlling a processor array comprising a plurality of processing nodes interconnected by an interconnection network for transferring messages among the processing nodes, the method comprising the steps of
   i. enabling the processing nodes to a plurality of genomes distributed among the processing nodes;
   ii. enabling said processing nodes to perform an evaluation operation in connection with each genome to generate an evaluation score associated with each genome;
   iii. enabling said processing nodes to generate a threshold value in response to the evaluation scores for the respective genomes;
   iv. enabling said processing nodes to identify from the genomes, surviving genomes in response to each genome's evaluation score and the threshold value, the surviving genome control step including the steps of:
      A. enabling said processing nodes to generate an alive flag array comprising a plurality of flags each associated with a genome;
      B. enabling said processing nodes to compare the evaluation scores associated with the genomes maintained by the respective processing nodes to the threshold value to identify surviving genomes; and
      C. enabling the processing nodes to condition the alive flags in response to the comparison;
   v. enabling said processing nodes to, in messages transmitted over the interconnection network, duplicate the surviving genomes as a function of their respective evaluation scores and, in messages transmitted over the interconnection network;
   vi. enabling said processing nodes to perform a random mating operation in connection with surviving genomes and the original genomes to generate a plurality of mated genomes for use along with the surviving genomes as genomes in a subsequent iteration;
   vii. enabling said genome array establishment portion, said evaluation score generation control portion, said threshold score generation control portion, said surviving genome propagation control portion and said genome mating control portion, to control said processing nodes in a series of iterations, the mated genomes and surviving genomes generated during each iteration being used as genomes for the subsequent iteration.

13. A genetic algorithm method as defined in claim 12 in which, during the genome generation step, the processing nodes are enabled to generate a genome array comprising a plurality of genome entries distributed among said processing nodes, each genome entry including a genome.

14. A genetic algorithm method as defined in claim 12 in which said threshold score generation control step includes the further step of enabling one of said processing nodes which maintains the identified sorted evaluation score entry to generate a broadcast message including the threshold value for broadcast over interconnection network, thereby to distribute the threshold value to all of said processing nodes.

15. A genetic algorithm step as defined in claim 12 in which said surviving genome control step further includes the step of enabling said processing nodes to compare each genome's evaluation score to the threshold value to identify surviving genomes.

16. A genetic algorithm method as defined in claim 15 in which the surviving genome control step includes the steps of:
   A. enabling said processing nodes to generate an alive flag array comprising a plurality of flags each associated with a genome;
   B. enabling said processing nodes to compare the evaluation scores associated with the genomes maintained by the respective processing nodes to the threshold value to identify surviving genomes; and
   C. enabling the processing nodes to condition the alive flags in response to the comparison.

17. A genetic algorithm method as defined in claim 12 in which the surviving genome propagation control step includes the step of enables said processing nodes to generate a surviving genome array including a number of entries each containing a copy of a surviving genome, the surviving genome propagation control step including the step of enabling the processing nodes to generate a number of copies of each surviving genome in relation to its evaluation score and a value corresponding to the sum of normalized evaluation scores for the surviving genomes.

18. A genetic algorithm method as defined in claim 17 in which, for each surviving genome, the normalized evaluation-score corresponds to the difference between the surviving genome's evaluation score and the threshold value.

19. A genetic algorithm method as defined in claim 17 in which the surviving genome copies are distributed among the processing nodes.

20. A genetic algorithm method as defined in claim 17 in which the genome mating control step includes the steps of:
   A. enabling the processing nodes to randomly distribute said genomes thereamong said processing nodes in messages transmitted over the interconnection network; and
   B. enabling the processing nodes to perform a mating operation between genomes and the surviving genome copies to generate mated genomes.

21. A genetic algorithm method as defined in claim 20 in which the genome mating control step includes the step of enabling the processing nodes to maintain at least some surviving genome copies in an unmated condition.

22. A genetic algorithm method as defined in claim 20 in which the genome mating control step further includes the step of enabling the processing nodes to randomly distribute the mated genomes among the processing nodes for use as genomes during a subsequent iteration.

23. A genetic algorithm method as defined in claim 12 in which, during the genome generation step, the processing nodes are enabled to generate a genome array comprising a plurality of genome entries distributed among said processing nodes, each genome entry including a genome.

24. A genetic algorithm method as defined in claim 12 in which said evaluation score generation control step includes the steps of:
   A. enabling said processing nodes to establish an evaluation score array having a plurality of evaluation score entries each associated with a genome,
   B. enabling the processing nodes to, in parallel, perform evaluation operations in connection with each of their respective genomes to generate an evaluation score and for storing the evaluation score in the evaluation score array entry associated therewith.

25. A genetic algorithm method as defined in claim 12 in which said threshold score generation control step includes the further step of enabling one of said processing nodes which maintains the identified sorted evaluation score entry to generate a broadcast message including the threshold value for broadcast over interconnection network, thereby to distribute the threshold value to all of said processing nodes.

26. A genetic algorithm method as defined in claim 12 in which the surviving genome propagation control step includes the step of enables said processing nodes to generate a surviving genome array including a number of entries each containing a copy of a surviving genome, the surviving genome propagation control step including the step of enabling the processing nodes to generate a number of copies of each surviving genome in relation to its evaluation score and a value corresponding to the sum of normalized evaluation scores for the surviving genomes.

27. A genetic algorithm method as defined in claim 12 in which, for each surviving genome, the normalized evaluation score corresponds to the difference between the surviving genome's evaluation score and the threshold value.

28. A genetic algorithm method as defined in claim 12 in which the surviving genome copies are distributed among the processing nodes.

29. A genetic algorithm method as defined in claim 12 in which the genome mating control step includes the steps of:
   A. enabling the processing nodes to randomly distribute said genomes thereamong said processing nodes in messages transmitted over the interconnection network; and
   B. enabling the processing nodes to perform a mating operation between genomes and the surviving genome copies to generate mated genomes.

30. A genetic algorithm method as defined in claim 29 in which the genome mating control step includes the step of enabling the processing nodes to maintain at least some surviving genome copies in an unmated condition.

31. A genetic algorithm method as defined in claim 29 in which the genome mating control step further includes the step of enabling the processing nodes to randomly distribute the mated genomes among the processing nodes for use as genomes during a subsequent iteration.

32. A genetic algorithm system comprising:
   A. a processor array comprising a plurality of processing nodes interconnected by an interconnection network for transferring messages among the processing nodes;
   B. a control subsystem comprising:
      i. a genome generation portion for enabling the processing nodes to a plurality of genomes distributed among the processing nodes;
      ii. an evaluation score generation control portion for enabling said processing nodes to perform an evaluation operation in connection with each genome to generate an evaluation score associated with each genome;
      iii. a threshold score generation control portion for enabling said processing nodes to generate a threshold value in response to the evaluation scores for the respective genomes;
      iv. a surviving genome control portion for enabling said processing nodes to identify from the genomes, surviving genomes in response to each genome's evaluation score and the threshold value;
      v. a surviving genome propagation control portion for enabling said processing nodes to, in messages transmitted over the interconnection network, duplicate the surviving genomes in relation to a comparison between their respective evaluation scores and said threshold value, in messages transmitted over the interconnection network; the surviving genome control portion including
         (a) an alive flag array generator for enabling said processing nodes to generate an alive flag array comprising a plurality of flags each associated with a genome;
         (b) a comparator for enabling said processing nodes to compare the evaluation scores associated with the genomes maintained by the respective processing nodes to the threshold value to identify surviving genomes; and
         (c) an alive flag conditioner for enabling the processing nodes to condition the alive flags in response to the comparison;
      vi. a genome mating control portion for enabling said processing nodes to perform a random mating operation in connection with surviving genomes and the original genomes to generate a plurality of mated genomes for use along with the surviving genomes as genomes in a subsequent iteration; and
      vii. an iteration control portion for enabling said genome array establishment portion, said evaluation score generation control portion, said threshold score generation control portion, said surviving genome propagation control portion and said genome mating control portion, to control said processing nodes in a series of iterations, the mated genomes and surviving genomes generated during each iteration being used as genomes for the subsequent iteration.

33. A genetic algorithm system as defined in claim 32 in which the genome generation portion enables the processing nodes to generate a genome array comprising a plurality of genome entries distributed among said processing nodes, each genome entry including a genome.

34. A genetic algorithm system as defined in claim 32 in which said evaluation score generation control portion includes:
   A. an evaluation score array generation control portion for enabling said processing nodes to establish an evaluation score array having a plurality of evaluation score entries each associated with a genome, B. an evaluation score control portion for enabling the processing nodes to, in parallel, perform evaluation operations in connection with each of their respective genomes to generate an evaluation score and for storing the evaluation score in the evaluation score array entry associated therewith.

35. A genetic algorithm system as defined in claim 32 in which the surviving genome propagation control portion enables said processing nodes to generate a surviving genome array including a number of entries each containing a copy of a surviving genome, the surviving genome propagation control portion generating a number of copies of each surviving genome in relation to its evaluation score and a value corresponding to the sum of normalized evaluation scores for the surviving genomes.

36. A genetic algorithm system as defined in claim 35 in which, for each surviving genome, the normalized evaluation score corresponds to the difference between the surviving genome's evaluation score and the threshold value.

37. A genetic algorithm system as defined in claim 35 in which the surviving genome copies are distributed among the processing nodes.

38. A genetic algorithm system as defined in claim 35 in which the genome mating control portion includes:
  A. a genome distribution element for enabling the processing nodes to randomly distribute said genomes thereamong said processing nodes in messages transmitted over the interconnection network;
  B. a mating operation control element for enabling the processing nodes to perform a mating operation between genomes and the surviving genome copies to generate mated genomes.

39. A genetic algorithm system as defined in claim 38 in which the genome mating control portion enables the processing nodes to maintain at least some surviving genome copies in an unmated condition.

40. A genetic algorithm system as defined in claim 38 in which the genome mating control portion further includes a mated genome distribution control element for enabling the processing nodes to randomly distribute the mated genomes among the processing nodes for use as genomes during a subsequent iteration.

41. A genetic algorithm system comprising:
  A. a processor array comprising a plurality of processing nodes interconnected by an interconnection network for transferring messages among the processing nodes;
  B. a control subsystem comprising:
    i. a genome generation portion for enabling the processing nodes to a plurality of genomes distributed among the processing nodes;
    ii. an evaluation score generation control portion for enabling said processing nodes to perform an evaluation operation in connection with each genome to generate an evaluation score associated with each genome;
    iii. a threshold score generation control portion for enabling said processing nodes to generate a threshold value in response to the evaluation scores for the respective genomes;
    iv. a surviving genome control portion for enabling said processing nodes to identify from the genomes, surviving genomes in response to each genome's evaluation score and the threshold value;
    v. a surviving genome propagation control portion for enabling said processing nodes to, in messages transmitted over the interconnection network, duplicate the surviving genomes as a function of their respective evaluation scores and, in messages transmitted over the interconnection network, the surviving genome propagation control portion enabling said processing nodes to
      (a) generate a surviving genome array including a number of entries each containing a copy of a surviving genome, and
      (b) a number of copies of each surviving genome in relation to its evaluation score and a value corresponding to the sum of normalized evaluation scores for the surviving genomes, for each surviving genome the normalized evaluation score corresponds to the difference between the surviving genome's evaluation score and the threshold value,
      the surviving genome copies being distributed among the processing nodes;
    vi. a genome mating control portion for enabling said processing nodes to perform a random mating operation in connection with surviving genomes and the original genomes to generate a plurality of mated genomes for use along with the surviving genomes as genomes in a subsequent iteration; the genome mating control portion including
      A. a genome distribution element for enabling the processing nodes to randomly distribute said genomes thereamong said processing nodes in messages transmitted over the interconnection network;
      B. a mating operation control element for enabling the processing nodes to perform a mating operation between genomes and the surviving genome copies to generate mated genomes,
      the genome mating control portion enabling the processing nodes to maintain at least some surviving genome copies in an unmated condition; and
    vii. an iteration control portion for enabling said genome array establishment portion, said evaluation score generation control portion, said threshold score generation control portion, said surviving genome propagation control portion and said genome mating control portion, to control said processing nodes in a series of iterations, the mated genomes and surviving genomes generated during each iteration being used as genomes for the subsequent iteration.

42. A genetic algorithm system as defined in claim 41 in which the genome generation portion enables the processing nodes to generate a genome array comprising a plurality of genome entries distributed among said processing nodes, each genome entry including a genome.

43. A genetic algorithm system as defined in claim 41 in which said evaluation score generation control portion includes:
  A. an evaluation score array generation control portion for enabling said processing nodes to establish an evaluation score array having a plurality of evaluation score entries each associated with a genome,
  B. an evaluation score control portion for enabling the processing nodes to, in parallel, perform evaluation operations in connection with each of their respective genomes to generate an evaluation score and for storing the evaluation score in the evaluation score array entry associated therewith.

44. A genetic algorithm system comprising:
A. a processor array comprising a plurality of processing nodes interconnected by an interconnection network for transferring messages among the processing nodes;

B. a control subsystem comprising:
  i. a genome generation portion for enabling the processing nodes to a plurality of genomes distributed among the processing nodes;
  ii. an evaluation score generation control portion for enabling said processing nodes to perform an evaluation operation in connection with each genome to generate an evaluation score associated with each genome;
  iii. a threshold score generation control portion for enabling said processing nodes to generate a threshold value in response to the evaluation scores for the respective genomes;
  iv. a surviving genome control portion for enabling said processing nodes to identify from the genomes, surviving genomes in response to each genome's evaluation score and the threshold value;
  v. a surviving genome propagation control portion for enabling said processing nodes to, in messages transmitted over the interconnection network, duplicate the surviving genomes as a function of their respective evaluation scores and, in messages transmitted over the interconnection network, the surviving genome propagation control portion enabling said processing nodes to
    (a) generate a surviving genome array including a number of entries each containing a copy of a surviving genome, and
    (b) a number of copies of each surviving genome in relation to its evaluation score and a value corresponding to the sum of normalized evaluation scores for the surviving genomes, for each surviving genome the normalized evaluation score corresponds to the difference between the surviving genome's evaluation score and the threshold value,
    the surviving genome copies are distributed among the processing nodes;
  vi. a genome mating control portion for enabling said processing nodes to perform a random mating operation in connection with surviving genomes and the original genomes to generate a plurality of mated genomes for use along with the surviving genomes as genomes in a subsequent iteration; the genome mating control portion including
    A. a genome distribution element for enabling the processing nodes to randomly distribute said genomes thereamong said processing nodes in messages transmitted over the interconnection network;
    B. a mating operation control element for enabling the processing nodes to perform a mating operation between genomes and the surviving genome copies to generate mated genomes,
    C. a mated genome distribution control element for enabling the processing nodes to randomly distribute the mated genomes among the processing nodes for use as genomes during a subsequent iteration; and
  vii. an iteration control portion for enabling said genome array establishment portion, said evaluation score generation control portion, said threshold score generation control portion, said surviving genome propagation control portion and said genome mating control portion, to control said processing nodes in a series of iterations, the mated genomes and surviving genomes generated during each iteration being used as genomes for the subsequent iteration.

45. A genetic algorithm system as defined in claim 44 in which the genome generation portion enables the processing nodes to generate a genome array comprising a plurality of genome entries distributed among said processing nodes, each genome entry including a genome.

46. A genetic algorithm system as defined in claim 44 in which said evaluation score generation control portion includes:
  A. an evaluation score array generation control portion for enabling said processing nodes to establish an evaluation score array having a plurality of evaluation score entries each associated with a genome,
  B. an evaluation score control portion for enabling the processing nodes to, in parallel, perform evaluation operations in connection with each of their respective genomes to generate an evaluation score and for storing the evaluation score in the evaluation score array entry associated therewith.

47. A genetic algorithm method for controlling a processor array comprising a plurality of processing nodes interconnected by an interconnection network for transferring messages among the processing nodes, the method comprising the steps of
  i. enabling the processing nodes to a plurality of genomes distributed among the processing nodes;
  ii. enabling said processing nodes to perform an evaluation operation in connection with each genome to generate an evaluation score associated with each genome, said evaluation score generation step including the steps of:
    A. enabling said processing nodes to establish an evaluation score array having a plurality of evaluation score entries each associated with a genome,
    B. enabling the processing nodes to, in parallel, perform evaluation operations in connection with each of their respective genomes to generate an evaluation score and for storing the evaluation score in the evaluation score array entry associated therewith;
  iii. enabling said processing nodes to generate a threshold value in response to the evaluation scores for the respective genomes, said threshold score generation control step including the steps of:
    A. enabling the processing nodes to generate a sorted evaluation score array comprising a plurality of sorted evaluation score entries in which the evaluation scores from the evaluation score array are in stored order;
    B. enabling the processing nodes to identify a sorted evaluation score entry in response to a reaper percentage value, the evaluation score in the identified sorted evaluation score entry comprising the threshold value;
  iv. enabling said processing nodes to identify from the genomes, surviving genomes in response to each genome's evaluation score and the threshold value;
  v. enabling said processing nodes to, in messages transmitted over the interconnection network, duplicate the surviving genomes as a function of their respective evaluation scores and, in messages transmitted over the interconnection network;
  vi. enabling said processing nodes to perform a random mating operation in connection with surviving genomes and the original genomes to generate a plurality of mated genomes for use along with the surviving genomes as genomes in a subsequent iteration;
  vii. enabling said genome array establishment portion, said evaluation score generation control portion, said threshold score generation control portion, said surviving genome propagation control portion and said genome mating control portion, to control said processing nodes in a series of iterations, the mated genomes and surviving genomes generated during each iteration being used as genomes for the subsequent iteration.

48. A genetic algorithm method for controlling a processor array comprising a plurality of processing nodes interconnected by an interconnection network for transferring messages among the processing nodes, the method comprising the steps of i. enabling the processing nodes to a plurality of genomes distributed among the processing nodes;

ii. enabling said processing nodes to perform an evaluation operation in connection with each genome to generate an evaluation score associated with each genome;

iii. enabling said processing nodes to generate a threshold value in response to the evaluation scores for the respective genomes;

iv. enabling said processing nodes to identify from the genomes, surviving genomes in response to each genome's evaluation score and the threshold value;

v. enabling said processing nodes to, in messages transmitted over the interconnection network, duplicate the surviving genomes as a function of their respective evaluation scores and, in messages transmitted over the interconnection network, the surviving genome propagation control step including the steps of:

(a) enabling said processing nodes to generate a surviving genome array including a number of entries each containing a copy of a surviving genome, (b) enabling the processing nodes to generate a number of copies of each surviving genome in relation to its evaluation score and a value corresponding to the sum of normalized evaluation scores for the surviving genomes, the normalized evaluation score corresponding to the difference between the surviving genome's evaluation score and the threshold value, the surviving genome copies being distributed among the processing nodes;

vi. enabling said processing nodes to perform a random mating operation in connection with surviving genomes and the original genomes to generate a plurality of mated genomes for use along with the surviving genomes as genomes in a subsequent iteration, the genome mating control step including the steps of:

(a) enabling the processing nodes to randomly distribute said genomes thereamong said processing nodes in messages transmitted over the interconnection network;

(b) enabling the processing nodes to perform a mating operation between genomes and the surviving genome copies to generate mated genomes;

(c) enabling the processing nodes to maintain at least some surviving genome copies in an unmated condition;

vii. enabling said genome array establishment portion, said evaluation score generation control portion, said threshold score generation control portion, said surviving genome propagation control portion and said genome mating control portion, to control said processing nodes in a series of iterations, the mated genomes and surviving genomes generated during each iteration being used as genomes for the subsequent iteration.

49. A genetic algorithm method as defined in claim 48 in which, during the genome generation step, the processing nodes are enabled to generate a genome array comprising a plurality of genome entries distributed among said processing nodes, each genome entry including a genome.

50. A genetic algorithm method as defined in claim 48 in which said evaluation score generation control step includes the steps of:

A. enabling said processing nodes to establish an evaluation score array having a plurality of evaluation score entries each associated with a genome, B. enabling the processing nodes to, in parallel, perform evaluation operations in connection with each of their respective genomes to generate an evaluation score and for storing the evaluation score in the evaluation score array entry associated therewith.

51. A genetic algorithm method for controlling a processor array comprising a plurality of processing nodes interconnected by an interconnection network for transferring messages among the processing nodes, the method comprising the steps of i. enabling the processing nodes to a plurality of genomes distributed among the processing nodes;

ii. enabling said processing nodes to perform an evaluation operation in connection with each genome to generate an evaluation score associated with each genome;

iii. enabling said processing nodes to generate a threshold value in response to the evaluation scores for the respective genomes;

iv. enabling said processing nodes to identify from the genomes, surviving genomes in response to each genome's evaluation score and the threshold value;

v. enabling said processing nodes to, in messages transmitted over the interconnection network, duplicate the surviving genomes as a function of their respective evaluation scores and, in messages transmitted over the interconnection network, the surviving genome propagation control step including the steps of:

(a) enabling said processing nodes to generate a surviving genome array including a number of entries each containing a copy of a surviving genome, (b) enabling the processing nodes to generate a number of copies of each surviving genome in relation to its evaluation score and a value corresponding to the sum of normalized evaluation scores for the surviving genomes, the normalized evaluation score corresponding to the difference between the surviving genome's evaluation score and the threshold value, the surviving genome copies being distributed among the processing nodes;

vi. enabling said processing nodes to perform a random mating operation in connection with surviving genomes and the original genomes to generate a plurality of mated genomes for use along with the surviving genomes as genomes in a subsequent iteration, the genome mating control step including the steps of:

(a) enabling the processing nodes to randomly distribute said genomes thereamong said processing nodes in messages transmitted over the interconnection network;

(b) enabling the processing nodes to perform a mating operation between genomes and the surviving genome copies to generate mated genomes; and (c) enabling the processing nodes to randomly distribute the mated genomes among the processing nodes for use as genomes during a subsequent iteration;

vii. enabling said genome array establishment portion, said evaluation score generation control portion, said threshold score generation control portion, said surviving genome propagation control portion and said genome mating control portion, to control said processing nodes in a series of iterations, the mated genomes and surviving genomes generated during each iteration being used as genomes for the subsequent iteration.

52. A genetic algorithm method as defined in claim 51 in which, during the genome generation step, the processing nodes are enabled to generate a genome array comprising a plurality of genome entries distributed among said processing nodes, each genome entry including a genome.

53. A genetic algorithm method as defined in claim 52 in which said evaluation score generation control step includes the steps of:
A. enabling said processing nodes to establish an evaluation score array having a plurality of evaluation score entries each associated with a genome,
B. enabling the processing nodes to, in parallel, perform evaluation operations in connection with each of their respective genomes to generate an evaluation score and for storing the evaluation score in the evaluation score array entry associated therewith.

* * * * *